United States Patent
Nielsen et al.

(10) Patent No.: US 9,321,391 B2
(45) Date of Patent: Apr. 26, 2016

(54) CONVERTIBLE CARGO TRANSPORTATION CONTAINER AND CONVERTIBLE CARGO TRANSPORTATION VEHICLE

(71) Applicant: German Pellets GmbH, Wismar (DE)

(72) Inventors: Mikael Nielsen, Wismar (DE); Benjamin Neter, Wismar (DE)

(73) Assignee: German Pellets GmbH, Wismar (DE)

( * ) Notice: Subject to any disclaimer, the term of this patent is extended or adjusted under 35 U.S.C. 154(b) by 0 days.

(21) Appl. No.: 14/298,103

(22) Filed: Jun. 6, 2014

(65) Prior Publication Data

US 2015/0352996 A1    Dec. 10, 2015

(51) Int. Cl.
| | |
|---|---|
| *B60J 5/00* | (2006.01) |
| *B60P 3/42* | (2006.01) |
| *B60P 3/41* | (2006.01) |
| *B65D 88/12* | (2006.01) |
| *B65D 90/54* | (2006.01) |

(52) U.S. Cl.
CPC ... *B60P 3/42* (2013.01); *B60P 3/41* (2013.01); *B65D 88/123* (2013.01); *B65D 90/54* (2013.01)

(58) Field of Classification Search
CPC .......... B60P 3/42; B60P 3/41; B65D 88/123; B65D 90/54
See application file for complete search history.

(56) References Cited

U.S. PATENT DOCUMENTS

| | | | |
|---|---|---|---|
| 2,761,581 A | 9/1956 | Cohee | |
| 4,678,389 A * | 7/1987 | Bonerb | 414/267 |
| 4,735,457 A * | 4/1988 | Bonerb et al. | 298/27 |
| 6,152,511 A * | 11/2000 | Gustafson | 296/32 |
| 2004/0188433 A1* | 9/2004 | Morales et al. | 220/1.5 |
| 2005/0092799 A1* | 5/2005 | Morris | 224/484 |
| 2007/0041803 A1* | 2/2007 | Whitehead et al. | 410/37 |
| 2012/0321436 A1 | 12/2012 | Diniaco | |

FOREIGN PATENT DOCUMENTS

| | | |
|---|---|---|
| EP | 0587063 | 3/1994 |
| EP | 0835783 | 4/1998 |
| GB | 2274274 | 7/1994 |
| WO | WO 90/08088 | 7/1990 |
| WO | WO 95/16622 | 6/1995 |

* cited by examiner

*Primary Examiner* — Lori L Lyjak
(74) *Attorney, Agent, or Firm* — Baker & Hostetler LLP (57) ABSTRACT

The present invention provides a convertible cargo transportation vehicle. The convertible cargo transportation vehicle has a front end and a rear end with respect to the driving direction of the vehicle and comprises, in particular, a base frame, two or more containers attached to the base frame, the containers being arranged consecutively in the driving direction of the vehicle.

22 Claims, 5 Drawing Sheets

CONVERTIBLE CARGO TRANSPORTATION CONTAINER AND CONVERTIBLE CARGO TRANSPORTATION VEHICLE

BACKGROUND OF THE INVENTION

1. Field of the Invention

The present invention relates to transportation equipment, such as convertible cargo transportation systems that can be used for transportation of bulk cargo and long cargo and more specifically to a convertible cargo transportation vehicle that enables the transportation of bulk cargo such as wood pellets and long cargo such as timber trunks.

2. Description of Related Art

In recent years, wood pellets, as special form of bulk cargo, have become an ever increasing factor in heating and energy production.

Wood pellets are part of the range of renewable energies. Wood pellets are used not only in pellet ovens and heating systems but also in powerstations to generate electricity and heating energy.

Wood pellets are in general small, often cylindrical pellets made from dried wood-chippings. In particular, wood pellets are pressed from dried wood shavings, of which two different types of primary materials are generally used. On the one hand, residual wood from sawmills is used, taking the wood chips and the sawdust, both conventionally seen as waste or by-products. On the other hand, since the increasing demand for wood pellets cannot be satisfied by this residual wood material, the processing of log becomes increasingly important. For instance, log can exist in the form of "industrial" wood which is unsuitable for sawing or raw timber trunks. Before the actual pellet manufacturing process, this log is reduced to coarse chips. Following this step, the chippings are then introduced into the pellet manufacturing process.

Besides being an environmental friendly, $CO_2$-neutral source of energy and having a high energy density, one of the major advantages of wood pellets is their good storage and transportation properties.

However, this advantage is partly compensated by the fact that upon delivery of the wood pellets, a considerable number of empty trips results, which is both uneconomical and unecological.

Also from the viewpoint of a freight forwarder working in the wood pellet business, this is a very unfavorable situation.

Needless to say, these problems not only arise in connection with wood pellets. Similar problems quite general arise in connection with the transport of bulk material (e.g. sand, grain, pellets, etc.).

U.S. Pat. No. 2,761,581 A1 relates to cargo containers and more particularly to methods and apparatus whereby a string of individual cargo containers may be cooperatively loaded but individually sealed.

SUMMARY OF THE INVENTION

A cargo transportation system according to an aspect of the invention provides a more economical transport solution when it comes to transport bulk cargo, in particular wood pellets, and long cargo, in particular log or timber trunks.

Further, aspects of the present invention include a modular unit with which existing transport systems can be upgraded in order to allow for a more convenient and economical transport of both bulk cargo and long cargo, and a cargo transportation system that enables to lower the asset costs for a vehicle fleet of a freight forwarder.

According to one aspect of the present invention a convertible cargo transportation vehicle is provided. The convertible cargo transportation vehicle has a front end and a rear end with respect to the driving direction of the vehicle and comprises, in particular, a base frame, two or more containers attached to the base frame, the containers being arranged consecutively in the driving direction of the vehicle. Each container comprises: a bottom portion forming the bottom of the container, two side wall portions connected to the bottom portion such that they are located at left and right sides of the vehicle with respect to the driving direction, and a front side and a rear side, the front side facing the front end of the vehicle and the rear side facing the rear end of the vehicle, respectively. Further, at least one of the front side or rear side of each container, or both, have at least a door panel hingedly attached to one of the side portions. Preferably, the containers are open-topped or accessible from above.

According to another aspect of the present invention, a convertible cargo transportation semi-trailer is provided, the trailer comprising: a base frame, a subframe comprising a suspension apparatus for a set of wheels of the trailer, the subframe being connected to the base frame and being arranged in a region located towards the rear end of the trailer with respect to the driving direction of the trailer, and two containers attached to the base frame, one being arranged in a region at the front end side of the trailer, the other being arranged in a region of the subframe. Further, each container comprises a bottom portion forming the bottom of the container, two side wall portions connected to the bottom portion such that they are located at left and right sides of the trailer with respect to the driving direction, and a front side and a rear side, the front side facing the front end of the trailer and the rear side facing the rear end of the trailer. Further, the two containers are arranged such that a gap is interposed between the rear side of the one container and the front side of the other container. At least one of front side or rear side of each container, or both, is/are closable with a cover.

Accordingly, the configuration of the convertible cargo transportation vehicle/trailer enables, in some circumstances, the dual use of the vehicle. An opening of the door panels or removal of the cover provides a continuous cargo space extending from the front end side of the vehicle/trailer to the rear end side of the vehicle/trailer that is confined in sections by the side wall portions of the containers. In this state, long cargo such as timber can conveniently by placed on the vehicle/trailer. On the other hand, by closing of the door panels or attaching the covers a plurality of containers can be provided on the vehicle/trailer that can be used for the transport of bulk cargo such as wood pellets.

The possibility to use the convertible cargo transportation vehicle/trailer according to the above aspects in a dual way contributes to a reduction in the number of empty trips. Further, the asset costs for vehicle fleets can be reduced.

Further, the present invention according to yet another aspect provides a container for bulk cargo. The container is open-topped and comprises, in particular, a bottom portion forming the bottom of the container, two lateral side portions, and two longitudinal side portions. The longitudinal side portions are formed by two side wall portions connected with the bottom portion, wherein the two side wall portions oppose one another. Further, the lateral side portions are each provided with at least one door panel hingedly attached to a corresponding side wall portion, wherein the at least one door panel being configured to fully open and close the respective lateral side portion. Further, the container is configured to be mounted onto a base frame of a cargo transportation vehicle such that the side wall portions are arranged parallel to the driving direction of the vehicle. Preferably, the containers are open-topped or accessible from above.

With the described container, a modular unit is provided with which existing transport systems can be upgraded in order to enhance their functionality and range of application.

Further, the present invention according to yet another aspect provides a convertible cargo transportation vehicle having a front end and a rear end with respect to the driving direction of the vehicle, the convertible cargo transportation vehicle comprising: a base frame; two or more containers attached to the base frame, being arranged consecutively in the driving direction of the vehicle, wherein each one of the front of the rear container and a rear side of the front container including at least one door panel to enable communication between the two containers. Preferably, the containers are open-topped or accessible from above.

BRIEF DESCRIPTION OF THE DRAWINGS

The invention may be better understood by reference to the following specification disclosed in preferred embodiments thereof and taken in conjunction with the following accompanying drawings in which.

The description and the accompanying drawing are to be construed by ways of example and not of limitation.

DETAILED DESCRIPTION OF PREFERRED EMBODIMENTS

Figure 1:
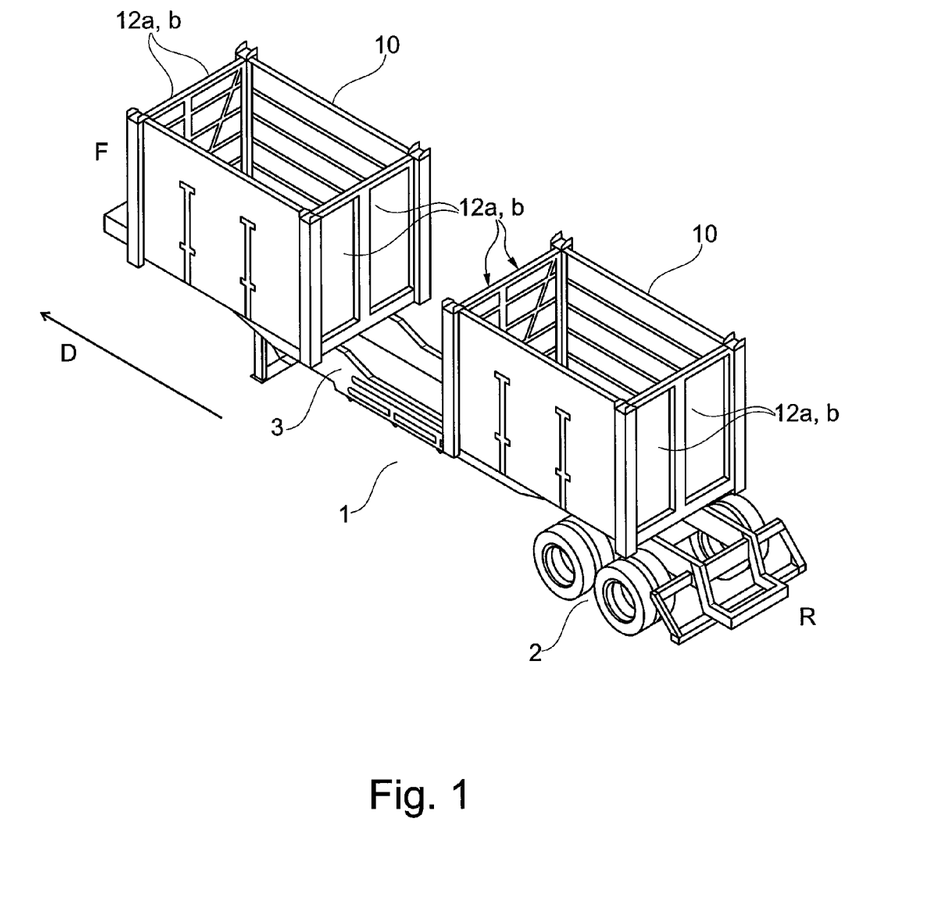
FIG. 1 shows a perspective view of a convertible cargo transportation vehicle according to an embodiment having two bulk cargo containers arranged at the front and rear end sides of the vehicle, respectively.
Figure 2A:
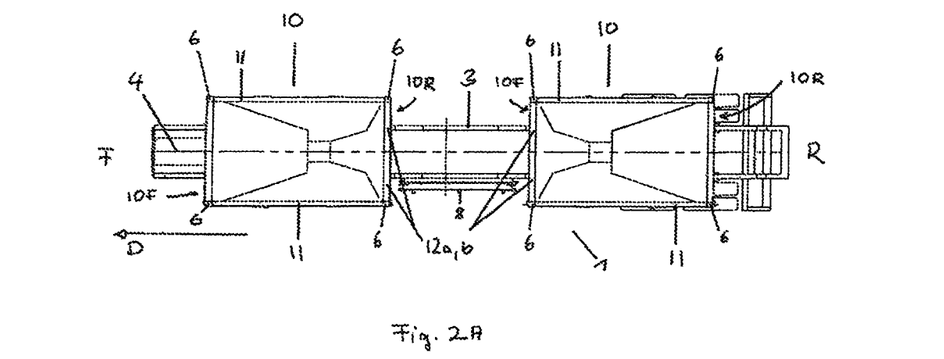
FIGS. 2A and 2B show top and side views of the convertible cargo transportation vehicle as shown in FIG. 1, respectively.
Figure 2B:
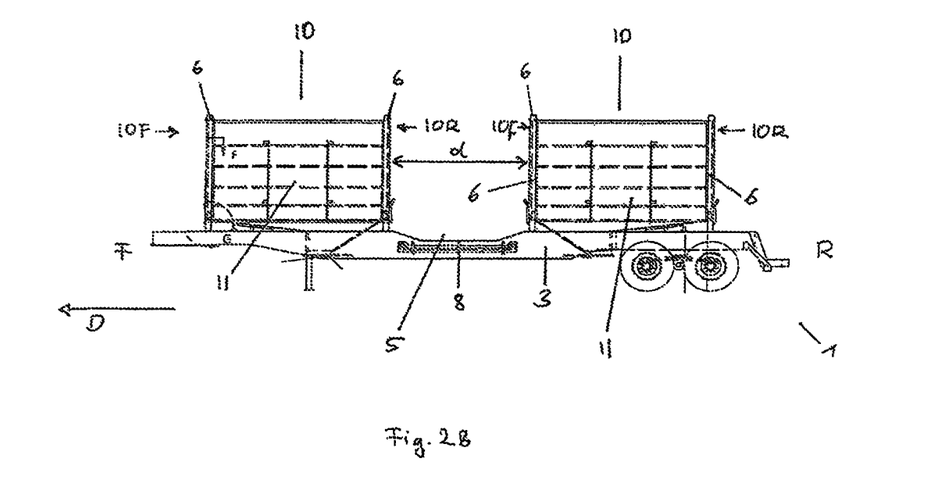

In FIGS. 1, 2A, and 2B, the convertible cargo transportation vehicle is shown as a convertible (semi-)trailer 1 to be attached to a towing vehicle such as a truck or semi-tractor. However, emphasize is put on the fact that this is done by way of example and not of limitation. The features and (sub-)combinations of features as described in the following can also be applied to other transportation vehicles such as flat-bedded solo trucks, articulated road trains, or freight cars. Accordingly, the claims are not intended to be unduly limited by the specification. Rather, the inventors intend the claims to be given their full scope according to their plain meaning.

As can be inferred from FIGS. 1, 2A, and 2B, the convertible trailer 1 comprises a base frame 3 having a subframe 2 that carries the suspension apparatus for the wheels 7 of the trailer 1. Thereby, the sub frame 2 is located at the rear end side R of the trailer 1. At the other end side, the front end side F of the trailer 1 (i.e. the forward end side of the trailer 1 in the driving direction D), a platform 4 is provided. This platform can comprise an engagement pin with which the trailer can be brought into engagement with a corresponding coupling device of a truck for a semi-trailer. Alternatively, the basic structure of the trailer 1 might also be directed to an articulated road train, in which the trailer is provided with its own turnable suspension subframe (not shown in the figures) at a region of platform 4, as will be understood by persons familiar with wood pellet transport technology.

The convertible trailer 1 is provided with containers 10. In the example as shown in the Figures, two containers 10 are provided. One of the containers 10 (subsequently also denoted as first container 10) is arranged in a region located at the front end side F of the convertible trailer 1 with respect to the driving direction D of the trailer. The other container 10 (subsequently also denoted as second container 10) is arranged in a region located at the rear end side R of the convertible trailer 1. Furthermore, the containers 10 may be arranged such that a gap of a given distance d is formed between the two containers 10 in the driving direction D. With other words the rear side 10R of the first container and the front side 10F of the second container 10 are separated by a gap of a distance d. Preferably, as shown in the figures, containers 10 are boxes or box-like.

However, the aforementioned gap is to be construed as an advantageous feature, only. Likewise, according to another aspect, the containers 10 might also be arranged with essentially no gap interspaced between, which configuration is not shown in FIG. 1.

Each of the two containers 10 comprises a hopper bottom or bottom portion 13 that forms the bottom of the container 10 and two side wall portions 11 that are connected to the bottom portion 13. The side wall portions 11 form the left and right side walls of the container 10. Thereby, the expressions "left" and "right" are defined with respect to the driving direction D of the convertible trailer 1. Thus, the direction left-right or right-left conforms to the width of the trailer/container. With other words this means that the side wall portions 11 of the containers 10 are arranged opposite to one another across the width of the trailer 1.

In the examples as shown in the drawings, the containers 10 are about as wide as the trailer, meaning that the distance between the opposing side wall portions 11 approximately matches the width of the trailer. However, there are of course other configurations possible, e.g., configurations according to which the containers 10 have a smaller or wider width than the trailer.

Further, each of the two containers 10 has a front side 10F and a rear side 10R. In the exemplary embodiment shown in the drawings, these front and rear sides 10F and 10R are closable with at least a pair of door panels 12a,b, hingedly attached to a corresponding one of the side wall portions 11, respectively. With other words this means that both sides of the containers 10 in the driving direction D can be closed with pairs of door panels 12a,b. Preferably, at least each one of the front of the rear (second) container and a rear side of the front (first) container including at least one door panel to enable communication between the two containers.

These door panels 12a,b can be opened such that the containers 10 are freely accessible in the driving direction D. Accordingly, by opening the door panels 12a,b, a continuous cargo space can be provided that extends in sections in the interior of the two containers 10 and that is, in sections, confined in the left-right-direction of the trailer 1 by the side wall portions 11 of the two containers 10.

Further, the containers 10 are preferably open-topped, i.e., do not comprise a fixed cover. Accordingly, with opened door panels 12a,b the cargo space in sections defined by the side wall portions 11 is accessible from above.

In order to protect cargo stored in the containers from the influence of weather or other environmental influences, the containers may according to some non-limiting configuration be covered with a removable cover (not shown in the drawings) such as a canvas, a tarpaulin or a removable panel, however. The removable cover may be moved by a handrail. A removable cover is particularly preferable if in some circumstances moisture sensitive goods such as wood pellets are to be transported in the container. The present invention is not limited to containers having an open top.

Figure 6:
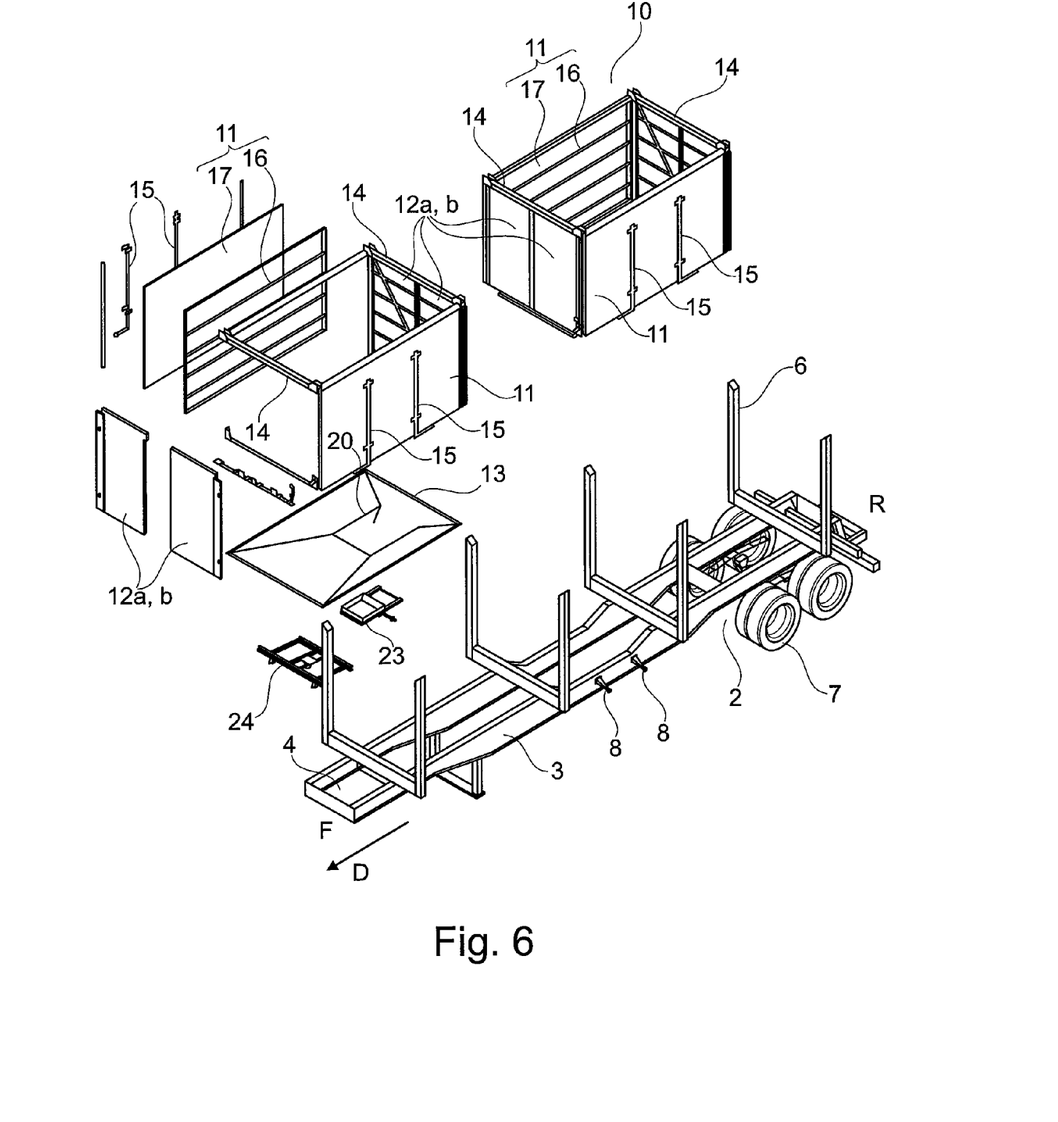
FIG. 6 is an exploded perspective view of a convertible cargo transportation vehicle according to an embodiment.
Figure 7:
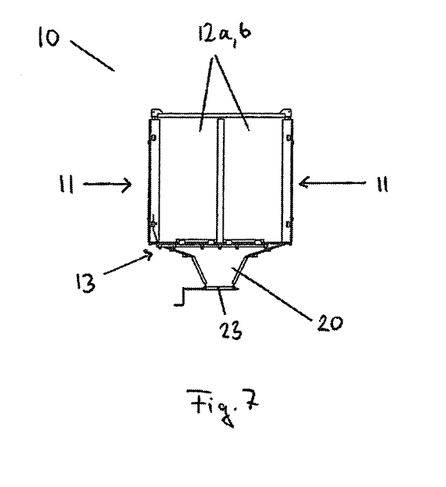
FIG. 7 is a front/rear view of a container according to an embodiment.
Figure 8:
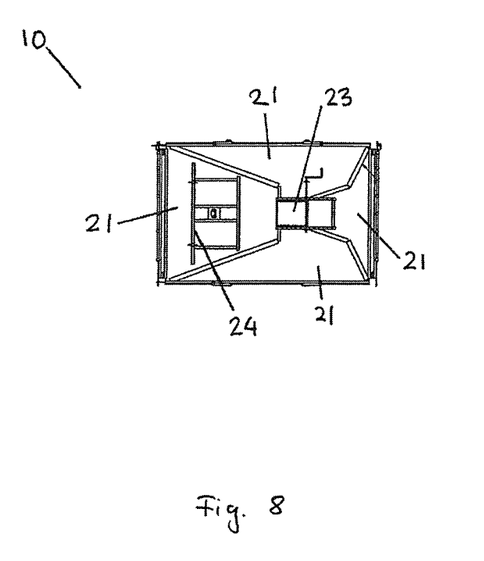
FIG. 8 is a bottom view of a container according to an embodiment.

In the exemplary embodiment as illustrated in FIGS. 1, 2A, 2B, and 6, the containers 10 are inserted between supporting struts 6 that project upwards from the base frame 3 of the convertible trailer 1. In particular, the trailer 1 comprises two opposing rows of four supporting struts 6, that project at left and right sides of the trailer 1, respectively. The containers 10 are inserted such that the vertical edges (or regions along the vertical edges) of the side wall portions 11 engage with the supporting struts 6 (FIG. 6). However, this is only meant by way of example and not of limitation. In general, the convertible trailer might comprise more or less than four pairs of supporting struts 6. In addition, the containers 10 might alternatively or additionally also be directly attached to the base frame 3 of the convertible trailer 1 or have other configurations.

However, the usage of the supporting struts 6 for inserting the containers 10 may in some circumstances have the particular advantage that the infrastructure of existing trailers or cargo transport vehicles for timber trunks can be used. In that case, the containers 10 may simply be inserted between the supporting struts 6 only requiring minor amendments to the underlying structure of the trailer 1. As such, the supporting struts 6 may additionally contribute to the structural integrity of the containers 10 when it comes to place cargo on/in the trailer.

The provision of preferably open topped containers 10 in regions located at both end sides F and R of the convertible trailer 1 enables a dual use of the convertible trailer 1. With closed door panels 12a,b, the containers 10 can be filled with bulk cargo such as wood pallets. With open door panels 12a,b, the continuous cargo space defined in sections within the containers 10 (i.e. by the side wall portions 11) is freely accessible from above of the convertible trailer 1 (and also in the driving direction D). This means that long cargo such as timber trunks can conveniently be placed onto the trailer. This dual use is in some circumstances or embodiments advantageous in that empty trips can be avoided and in that acquisition costs can be reduced since only one type of trailer needs to be purchased that can fulfill two functions.

For the dual use as a convertible cargo transportation vehicle for both, bulk cargo and long cargo, it is particularly advantageous, where a preferred embodiment is employed, if a gap is interspaced between the containers 10 in the driving direction D. In particular, as shown in FIG. 2B, a distance d (as width of the gap) is provided between the rear side 10R of the first container 10 and the front side 10F of the second container 10 (here "first" again refers to the first container in the driving direction D and "second" refers to the second container in the driving direction). With this arrangement, it is still possible to load and unload long cargos such as timber trunks with a grappler. For the same reason, the base frame 3 of the convertible trailer 1 may be provided with a recessed portion 5 in order to ensure that the base frame 3 of the trailer 1 does not interfere with the grappler.

However, it is of course also conceivable that the convertible trailer might comprise only one of the containers 10 extending over approximately the entire length of the trailer 1 (i.e. without the gap shown in FIGS. 1, 2A and 2B). Similarly, according to the respective needs, the trailer might also be provided with more than two containers 10.

Concerning the door panels 2a,b, it is preferred that the door panels 12a,b are openable to an extent so as not obstruct the loading procedure of the trailer 1 with timber trunks from above.

Accordingly, it is also preferred if the width d of the gap between the two containers 10 is at least wide enough to enable an appropriate opening of the door panels 12a,b such that they do not obstruct a loading procedure of long cargo from above.

In the exemplary embodiment as shown in FIGS. 1 to 2B, the door panels 12a,b are arranged such that they can be folded back onto the outer sides of the side wall portions 11 of the container 10. In order to secure the fully opened and back-folded door panels 12a,b in the opened position, door hold open locks 15 may be provided in an appropriate position on the outer sides of the side wall portions 11. The door hold open locks 15 are configured to engage with the fully opened door panels 12a,b in order to hold the door panels 12a,b in the opened position.

According to an alternative configuration, the door panels 12a,b, might also be latched in the state where they are opened by approximately 90 degrees, which, with other words, means that they form additional side wall portions when being in the opened state.

According to an alternative modification, the distance d of the gap between the two containers 10 might be adjusted such that the entire gap can be laterally covered by the opened door panels 12a,b that are latched at an opening angle of approximately 90 degrees. Accordingly, the load can be more effectively shielded, contributing both to road safety and fuel economy.

In the exemplary embodiment as shown in FIGS. 1, 2A, and 2B, the front sides 10F and rear sides 10R of the containers 10 are closable with two pairs of door panels 12a,b that are split at the middle in the width direction of the containers 10 (in the left-right direction). Each of the two door panels 12a,b of such a pair of door panels 12a,b is hingedly attached to one of the left or right side wall portions 11, respectively.

However, it is of course also conceivable that the containers 10 are closed by one single door panel that is hinged at only one of the side wall portions 11 of the containers 10. In that case, the door panel has the same width as the entire container 10.

As another alternative, the front sides 10F and rear sides 10R of the containers 10 might also be closed by a simple cover or cover panel that is not hingedly attached to the container 10 but only removably fixed onto the front sides 10F and rear sides 10R of the containers 10. If not in use for closing the front and rear sides of the containers, the cover panels might, for instance, be stored on the platform 4 or on the base frame 3 in the region of the gap between the containers 10. As yet another alternative, the front sides 10F and rear sides 10R of the containers 10 might also be closed by means of a flap hingedly attached to the bottom portions 13 of the containers 10.

Concerning the door panels 12a,b, it is furthermore preferred if they are provided with a rubber seam or the like at their peripheral edges to ensure that the bulk cargo stored in the containers 10 does not leak from the closed door panels 12a,b.

Figure 4:
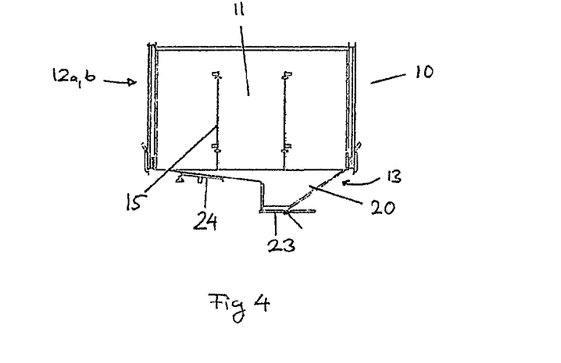
FIG. 4 shows a side view of the bulk cargo container of FIG. 3.

In order to further promote the tight closure of front and rear sides 10F, R of the container 10 by the door panels 12a,b, the container 10 might alternatively or additionally be provided with a removable header 14 spanning the upper edges of the door panels 12a,b in the closed position (FIG. 4). In other words, this means that the removable header 14 bridges between the opposing left and right side wall portions 11 of the container 10, providing a framing for the door panels 12a,b. Bridging between the side wall portions 11, the removable headers 14 act as a stiffening, since they limit an outward flex of the side wall portions 11 when the containers 10 are loaded with bulk cargo. In turn, this guarantees that the door panels 12a,b remain securely closed.

However, since these headers 14 would obstruct the loading of the convertible trailer with long cargo such as timber trunks from above, it is preferred if the headers 14 are easily removable. Therefore, in the exemplary embodiment shown here, the headers 14 are held in place by a removable fastening element such as a pin or a bolt. In this regard, the removable headers might either be connected directly to the side wall portions 11 or to the supporting struts 6 (where present). When the removable headers 14 are removed from the containers 10, they might, for instance, be stored in a corresponding receiving section 8 provided at the side of the base frame 3 of the convertible trailer 1 (see FIG. 2B, for instance).

Figure 3:
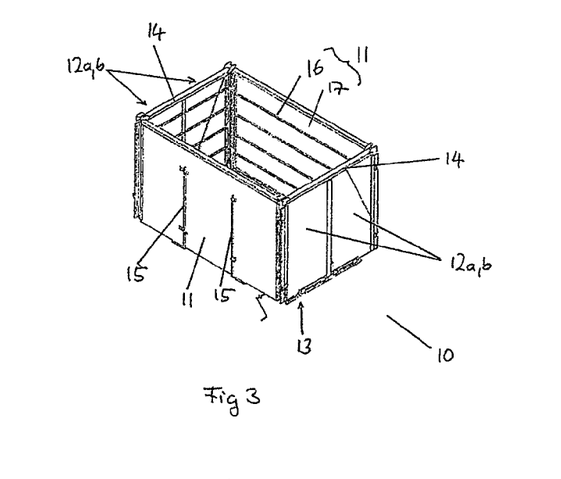
FIG. 3 shows a perspective view of a bulk cargo container according to a preferred embodiment.
Figure 5:
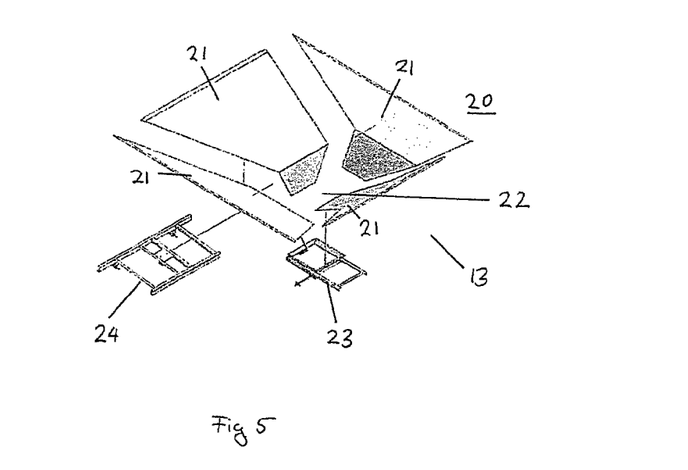
FIG. 5 is an exploded perspective view showing an example for a bottom portion of the bulk cargo container.

FIGS. 3, 4 and 5 provide a more detailed picture of exemplary embodiments for the container 10. As can be seen in FIG. 3, for instance, the side walls 11 as well as the door panels 12a,b can be formed of a supporting frame 16, onto which wall panels 17 are fixed.

FIGS. 4 and 5 illustrate an embodiment for the bottom portion 13 of the container 10. As shown in the side view of FIG. 4, the container 10 might comprise a bottom portion 13 that is formed in the shape of a funnel-like tub 20, having corresponding tub sections 21 (as illustrated in the exploded perspective view of FIG. 5). At the bottom of the tub 20, an opening 22 is provided that can selectively be opened and closed by a gate 23. In the illustrated embodiment, the funnel-like tub 20 protrudes downward from the container 10. However, a funnel-like tub might be also integrated in the container such it does not protrude.

By opening the gate 23, bulk cargo stored in the closed containers 10 can easily be dumped. As can be seen in the side views of FIGS. 4 and 2B, the downwardly protruding tub 20 (as the bottom portion 13 of the container 10) is preferably configured so as to be compatible with the structure of the base frame of the trailer 1. In particular, if required, it may be configured so as not to interfere with the subframe 2, holding the suspension apparatus for the wheels 7. In the present case, just by way of an example, in order to miss the subframe 2, a rear section 21 of the tub 20 of the second container 10 has a shallower angle of inclination than the front and side sections 21 of the tub 20.

In order to assist the dumping of bulk cargo through the tub 20, the tub 20 might be provided with a floor support 24 implemented as a vibration frame assembly that imparts vibration on sections 21 of the tub 20 (FIGS. 4 and 5). Preferably, this vibration device or vibratory feeder is arranged at the outer sides of the tub sections 21 and in regions where the angle of inclination of the respective tub section 21 is shallow.

To save costs due to the provision of common parts, the first container 10 can be arranged at the front end side of the trailer 1 has a similar tub structure (c.f. FIG. 2B). However, if required, the first container might be turned by 180° such that the tub section with the shallower angle of inclination is oriented towards the front end side of the trailer 1, thereby possibly making room for the platform 4 (FIG. 2B).

Especially the latter aspect hints at another advantageous feature of container 10 in some configurations. In particular, the container 10 can be conceived as a modular unit that can be easily incorporated in existing trailers for timber trunks in order to convert them into convertible cargo transportation vehicles according to the present invention.

Of course, this also applies for containers 10 not having a tub 20 as bottom portion 13 but rather a flat bottom (with or without an opening) which is an alternative configuration for the bottom portion 13.

From the foregoing, it will be seen that the structure and function described above has benefits, together with other advantages which are obvious and which are inherent to the system.

Since many possible embodiments maybe made of the invention without departing from the scope thereof, it is to be understood that all these matters herein set forth or shown in the accompanying drawings that are to be interpreted as illustrative and not in a limiting sense.

While specific embodiments have been shown and discussed, various modifications may of course be made, and the invention is not limited to the specific form or arrangements of parts described herein, except insofar as such limitations are included in the following claims. Further, it will be understood that certain features and sub-combinations are of utility and may be employed without reference to other features and sub combinations. This is contemplated by and is within the scope of the claims.

Further, any dimensions mentioned in connection with the preferred embodiments or shown in the figures do not limit the scope of the claims, either.

The invention claimed is:

1. Convertible cargo transportation vehicle having a front end and a rear end with respect to the driving direction of the vehicle, comprising:
   a base frame;
   two or more containers attached to the base frame, being arranged consecutively in the driving direction of the vehicle,
   wherein:
   each container comprises: a bottom portion forming the bottom of the container; two side wall portions connected to the bottom portion such that they are located at left and right sides of the vehicle with respect to the driving direction; and a front side and a rear side, the front side facing the front end of the vehicle and the rear side facing the rear end of the vehicle, respectively;
   at least either the front side or the rear side of each container, or both, have at least a door panel hingedly attached to one of the side portions; and
   the containers are arranged such that a gap is interposed between consecutive containers, the length of the gap being at least as large as the opening space for opening the door panels.

2. Convertible cargo transportation vehicle according to claim 1, wherein
   the front side and the rear side of each container are closed with a pair of split door panels that are split in the middle of the container, each door panel of the pair of split door panels being hingedly attached to a corresponding one of the side wall portions.

3. Convertible cargo transportation vehicle according to claim 1, wherein
   the vehicle comprises a plurality of supporting struts attached to the base frame of the vehicle and projecting upwards at left and right sides of the vehicle; and
   the containers are inserted between the supporting struts such that the supporting struts abut against the side wall portions.

4. Convertible cargo transportation vehicle according to claim 1, wherein in the region of the gap between the containers, a portion at the upper side of the base frame of the vehicle is recessed.

5. Convertible cargo transportation vehicle according to claim 1, wherein
the containers are structurally similar.

6. Convertible cargo transportation vehicle according to claim 5, wherein
the containers are attached to the base frame in configurations in which they are rotated by 180° with respect to one another.

7. Convertible cargo transportation semi-trailer, comprising:
a base frame;
a subframe comprising a suspension apparatus for a set of wheels of the trailer, the subframe being connected to the base frame and being arranged in a region located towards the rear end of the trailer with respect to the driving direction of the trailer;
two containers attached to the base frame, one being arranged in a region at the front end side of the trailer, the other being arranged in a region of the subframe;
wherein:
each container comprises: a bottom portion forming the bottom of the container; two side wall portions connected to the bottom portion such that they are located at left and right sides of the trailer with respect to the driving direction; and a front side and a rear side, the front side facing the front end of the trailer and the rear side facing the rear end of the trailer;
the two containers are arranged such that a gap is interposed between the rear side of the one container and the front side of the other container;
at least either the front side or the rear side of each container, or both, are closable with a cover.

8. Convertible cargo transportation semi-trailer according to claim 7, wherein the containers are open-topped.

9. Convertible cargo transportation semi-trailer according to claim 7, wherein
the cover includes a pair of split door panels that are split in the middle of the container, each door panel of the pair of split door panels being hingedly attached to a corresponding one of the side wall portions.

10. Convertible cargo transportation semi-trailer according to claim 7, wherein
the bottom portion of each container is formed into a funnel-like tub;
the funnel-like tub has an opening at the bottom thereof that can be opened and closed by a gate; and
the geometry of the funnel-like tub of the other container is configured such that it makes room for the subframe.

11. Convertible cargo transportation semi-trailer according to claim 7, wherein
the geometry of the funnel-like tub of the one container corresponds to the geometry of the other container; and
in the mounting position of two containers on the base frame of the semi-trailer, the one container is rotated by 180° as compared to the other container.

12. Convertible cargo transportation semi-trailer according to claim 7, wherein
the semi-trailer comprises two rows of four supporting struts being attached to the base frame and protruding upwards from the base frame, respectively, one row being arranged at the left side of the semi-trailer, the other row being arranged at the right side of the semi-trailer such that the supporting struts of one row are opposite to the supporting struts of the other row across the width of the trailer;
the two containers are inserted between the supporting struts such that the vertical edges of the side wall portions of the containers engage with a supporting strut; and
the side wall portions have approximately the same height as the as the protruding height of the upwardly protruding supporting struts.

13. Convertible cargo transportation semi-trailer according to claim 12, wherein
each container further comprises two removable headers having approximately the same lengths as the distance between the tips of two opposing supporting struts, the two opposing supporting struts opposing one another across the width of the vehicle; and
the removable headers are configured to be brought into removable engagement with the tips of opposing supporting struts.

14. Container for bulk cargo,
the container comprising:
a bottom portion forming the bottom of the container;
two lateral side portions; and
two longitudinal side portions;
wherein:
the longitudinal side portions are formed by two side wall portions connected with the bottom portion, the two side wall portions opposing one another;
the lateral side portions are provided with at least one door panel hingedly attached to a corresponding side wall portion, the at least one door panel being configured to fully open and close the respective lateral side portion;
the container is configured to be mounted onto a base frame of a convertible cargo transportation vehicle such that the side wall portions are arranged parallel to the driving direction of the vehicle;
the bottom portion of each container is formed into a funnel-like tub protruding downwardly from the container; and
the funnel-like tub has an opening at the bottom thereof that can be opened and closed by a gate.

15. Container for bulk cargo according to claim 14, wherein
the container is configured for being inserted between supporting struts of a timber transport vehicle such that the supporting struts abut against the side wall portions.

16. Convertible cargo transportation vehicle having a front end and a rear end with respect to the driving direction of the vehicle, comprising:
a base frame;
two or more containers attached to the base frame, being arranged consecutively in the driving direction of the vehicle,
each one of the front of the rear container and a rear side of the front container including at least one door panel to enable communication between the two containers
wherein the containers are arranged such that a gap is interposed between consecutive containers, the length of the gap being at least as large as the opening space for opening the door panels.

17. Convertible cargo transportation vehicle of claim 16, wherein each container is box-like and open-topped.

18. Convertible cargo transportation vehicle having a front end and a rear end with respect to the driving direction of the vehicle, comprising:
a base frame;

two or more containers attached to the base frame, being arranged consecutively in the driving direction of the vehicle, wherein:

each container comprises: a bottom portion forming the bottom of the container; two side wall portions connected to the bottom portion such that they are located at left and right sides of the vehicle with respect to the driving direction; and a front side and a rear side, the front side facing the front end of the vehicle and the rear side facing the rear end of the vehicle, respectively;

at least either the front side or the rear side of each container, or both, have at least a door panel hingedly attached to one of the side portions;

the door panels are configured to be folded back onto the outer sides of the side wall portions; and the containers further comprise door hold open locks arranged at the outer sides of the side wall portions and being configured to hold the back folded door panels in place.

19. Convertible cargo transportation vehicle having a front end and a rear end with respect to the driving direction of the vehicle, comprising:

a base frame;

two or more containers attached to the base frame, being arranged consecutively in the driving direction of the vehicle, wherein:

each container comprises: a bottom portion forming the bottom of the container; two side wall portions connected to the bottom portion such that they are located at left and right sides of the vehicle with respect to the driving direction; and a front side and a rear side, the front side facing the front end of the vehicle and the rear side facing the rear end of the vehicle, respectively;

at least either the front side or the rear side of each container, or both, have at least a door panel hingedly attached to one of the side portions;

the bottom portion of each container is formed into a funnel-like tub; and the funnel-like tub has an opening at the bottom thereof that can be opened and closed by a gate.

20. Convertible cargo transportation vehicle having a front end and a rear end with respect to the driving direction of the vehicle, comprising:

a base frame;

two or more containers attached to the base frame, being arranged consecutively in the driving direction of the vehicle, wherein:

each container comprises: a bottom portion forming the bottom of the container; two side wall portions connected to the bottom portion such that they are located at left and right sides of the vehicle with respect to the driving direction; and a front side and a rear side, the front side facing the front end of the vehicle and the rear side facing the rear end of the vehicle, respectively; and at least either the front side or the rear side of each container, or both, have at least a door panel hingedly attached to one of the side portions;

the containers further comprise a plurality of removable headers having approximately the same lengths as the distance between the top edges of the two side wall portions; and the removable headers are configured to be brought into removable engagement with the top edges of the side wall portions so as to bridge between the two side wall portions of the container.

21. Convertible cargo transportation vehicle according to claim 19, wherein the geometry of the tub is adapted to the base frame of the vehicle.

22. Convertible cargo transportation vehicle according to claim 20, wherein the containers comprise two removable headers that span over the top edges of the at least one door panel at the front side and the rear side of the container, respectively.

* * * * *